US012789176B2

(12) United States Patent
Wu et al.

(10) Patent No.: US 12,789,176 B2
(45) Date of Patent: Nov. 10, 2026

(54) ZONED CATALYTIC ARTICLE

(71) Applicant: BASF Mobile Emissions Catalysts LLC, Iselin, NJ (US)

(72) Inventors: Zhi Yi Wu, Shanghai (CN); Xin Zhu Liu, Shanghai (CN); Xiaoshuang Yang, Shanghai (CN); Shau-lin F. Chen, Shanghai (CN); Gianluca Volante, Hannover (DE); Markus Kinne, Hannover (DE); Xiaolai Zheng, Iselin, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 638 days.

(21) Appl. No.: 18/252,243

(22) PCT Filed: Nov. 10, 2021

(86) PCT No.: PCT/US2021/058735
§ 371 (c)(1),
(2) Date: May 9, 2023

(87) PCT Pub. No.: WO2022/103805
PCT Pub. Date: May 19, 2022

(65) Prior Publication Data

US 2023/0405568 A1 Dec. 21, 2023

(30) Foreign Application Priority Data

Nov. 13, 2020 (WO) ................ PCT/CN2020/128650

(51) Int. Cl.
*B01J 35/00* (2006.01)
*B01D 53/94* (2006.01)
(Continued)

(52) U.S. Cl.
CPC ............ *B01J 35/19* (2024.01); *B01D 53/945* (2013.01); *B01D 53/9468* (2013.01);
(Continued)

(58) Field of Classification Search
CPC ... B01J 35/19; B01J 35/40; B01J 35/56; B01J 21/04; B01J 23/002; B01J 23/10;
(Continued)

(56) References Cited

U.S. PATENT DOCUMENTS 8,394,348 B1 3/2013 Nunan et al.
8,968,690 B2 3/2015 Nunan et al.
(Continued)

FOREIGN PATENT DOCUMENTS

WO 2014/201094 A1 12/2014

OTHER PUBLICATIONS

International Search Report for PCT Patent Application No. PCT/US2021/058735, Issued on Feb. 10, 2022, 3 pages.

*Primary Examiner* — James A Fiorito
(74) *Attorney, Agent, or Firm* — DLA Piper LLP (US)

(57) ABSTRACT

The present invention relates to a zoned catalytic article, particularly useful for TWC, which comprises: a) a catalyst composition coat comprising a first zone of the catalyst composition coat, comprising a platinum group metal component consisting of a platinum component supported on a support; and a second zone of the catalyst composition coat, comprising a rhodium component and at least one of a platinum component and a palladium component supported individually or together on a support, and b) a substrate; wherein the first zone and the second zone of the catalyst composition coat are carried on a single piece of substrate or carried on respective pieces of substrate useful for treatment of exhaust gases and an exhaust treatment system comprising the zoned catalytic article. The present invention also
(Continued)

relates to an exhaust treatment system comprising the zoned catalytic article.

19 Claims, 4 Drawing Sheets

(51) Int. Cl.

| | |
|---|---|
| ***B01J 21/04*** | (2006.01) |
| ***B01J 23/00*** | (2006.01) |
| ***B01J 23/10*** | (2006.01) |
| ***B01J 23/63*** | (2006.01) |
| ***B01J 35/40*** | (2024.01) |
| ***B01J 35/56*** | (2024.01) |
| ***B01J 37/00*** | (2006.01) |
| ***B01J 37/02*** | (2006.01) |
| ***B01J 37/08*** | (2006.01) |
| ***F01N 3/28*** | (2006.01) |

(52) U.S. Cl.

CPC .......... *B01D 53/9472* (2013.01); *B01J 21/04* (2013.01); *B01J 23/002* (2013.01); *B01J 23/10* (2013.01); *B01J 23/63* (2013.01); *B01J 35/40* (2024.01); *B01J 35/56* (2024.01); *B01J 37/0018* (2013.01); *B01J 37/0036* (2013.01); *B01J 37/0203* (2013.01); *B01J 37/0225* (2013.01); *B01J 37/0228* (2013.01); *B01J 37/0236* (2013.01); *B01J 37/0244* (2013.01); *B01J 37/086* (2013.01); *F01N 3/2828* (2013.01); *B01D 2255/1021* (2013.01); *B01D 2255/1023* (2013.01); *B01D 2255/1025* (2013.01); *B01D 2255/9022* (2013.01); *B01D 2255/9032* (2013.01); *B01D 2255/908* (2013.01); *B01D 2255/9155* (2013.01); *B01D 2257/404* (2013.01); *B01D 2257/502* (2013.01); *B01D 2257/702* (2013.01); *B01D 2258/01* (2013.01); *B01J 2523/25* (2013.01); *B01J 2523/31* (2013.01); *B01J 2523/3706* (2013.01); *B01J 2523/3712* (2013.01); *B01J 2523/48* (2013.01); *F01N 2330/06* (2013.01); *F01N 2370/04* (2013.01); *F01N 2510/068* (2013.01)

(58) Field of Classification Search

CPC .... B01J 23/63; B01J 37/0018; B01J 37/0036; B01J 37/0203; B01J 37/0225; B01J 37/0228; B01J 37/0236; B01J 37/0244; B01J 37/086; B01D 53/945; B01D 53/9468; B01D 53/9472; F01N 3/2828

See application file for complete search history.

(56) References Cited

U.S. PATENT DOCUMENTS

2006/0251549 A1 11/2006 Kumar et al.
2019/0240643 A1 8/2019 Karpov et al.

ZONED CATALYTIC ARTICLE

CROSS-REFERENCE TO RELATED APPLICATIONS

This application is a National Stage application of PCT/US2021/058735, filed Nov. 10, 2021, which claims the benefit of priority to International Application No. PCT/CN2020/128650, filed Nov. 13, 2020, the contents of which are incorporated by reference herein in its entirety.

FIELD OF THE INVENTION

The present invention relates to a zoned catalytic article useful for treatment of exhaust gases and an exhaust treatment system comprising the zoned catalytic article. Particularly, the present invention relates to a zoned catalytic article useful in TWC converters for internal combustion engines, especially for motorcycles.

BACKGROUND OF THE INVENTION

Engine exhaust substantially consists of particulate matter and gaseous pollutants such as unburned hydrocarbons (HC), carbon monoxide (CO) and nitrogen oxides (NOx). For internal combustion engines, especially gasoline engines, three-way conversion catalysts (hereinafter interchangeably referred to as TWC catalyst or TWC) are widely used to treat the engine exhaust, and are able to simultaneously oxidize unburnt hydrocarbons and carbon monoxide and reduce nitrogen oxides.

In recent decades, automotive emission regulations are increasingly stringent worldwide, especially for the unburned hydrocarbons (HC), carbon monoxide (CO) and nitrogen oxides (NOx). Accordingly, there exist higher requirements for engines to generate less pollutants on one hand and for the TWC catalysts to more effectively convert the pollutants on the other hand.

Emission of nitrogen oxides (NOx) from engines has been defined to the lowest level among those gaseous pollutants. It will be desirable if the emission of unburned hydrocarbons (HC) and CO could be reduced to a higher extent.

Emission of unburnt hydrocarbons (HC) mainly comes from the cold-start phase of engines. Compared with CO and NOx, oxidation of the unburned hydrocarbons during the cold-start phase is more difficult due to the higher light-off temperature for most of the TWC catalysts. Effective oxidation of the unburnt hydrocarbons during the the cold-start phase poses a challenge for TWC catalyst manufacturers.

Emission of carbon monoxide (CO) from engines is not defined to a level as low as the unburnt hydrocarbons (HC) and NOx. It was said that a major proportion of CO emissions come from automobiles in urban areas, especially in developed countries or regions. CO is not only harmful for human health, but also detrimental to vegetation. Control of the emission of CO, the most abundant and perilous gaseous pollutant in the engine exhaust, poses another great challenge for the TWC catalyst manufacturers.

Thus, there is a need to provide TWC catalysts which are more effective for removal of HC, CO and NOx, especially for removal of HC and CO, from exhaust from internal combustion engines.

As an economical commuting vehicle, motorcycles are very popular in some areas, and even quantitatively exceed light-duty vehicles for example in parts of Asia. The emission regulations for motorcycles are however less stringent. TWC catalysts which are more effective for removal of HC, CO and NOx, especially for removal of HC and CO, will also be desirable for those areas where motorcycles are main vehicles.

SUMMARY OF THE INVENTION

The object of the present invention is to provide a catalytic article comprising platinum group metals, which has excellent catalytic performance in terms of abatement of HC, CO and NOx, especially effective to abatement of HC and CO.

It has been surprisingly found that the object of the present invention was achieved by a zoned catalytic article having a zone comprising only Pt as the platinum group metal.

Accordingly, in one aspect, the present invention provides a zoned catalytic article, which comprises a) a catalyst composition coat comprising
  i. a first zone of the catalyst composition coat, comprising a platinum group metal component consisting of a platinum component supported on a support; and
  ii. a second zone catalyst composition coat, comprising a rhodium component and at least one of a platinum component and a palladium component supported individually or together on a support, and b) a substrate;

wherein the first zone and the second zone of the catalyst composition coat are carried on a single piece of substrate or carried on respective pieces of substrate.

In another aspect, the present invention provides an exhaust treatment system comprising the zoned catalytic article as described herein located downstream of an internal combustion engine, particularly a gasoline engine.

In a further aspect, the present invention provides a method for treating an exhaust stream including contacting the exhaust stream with the zoned catalytic article or the exhaust treatment system as described herein.

DETAILED DESCRIPTION OF THE INVENTION

Figure 1A:
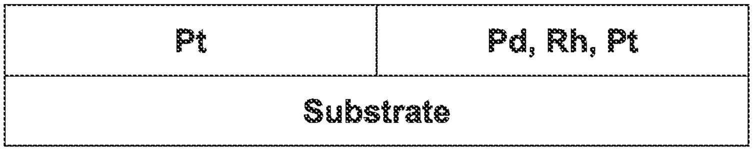
FIG. 1A is a schematic representation of the zoned catalytic article design with a single piece of substrate according to some embodiments of the present invention.
Figure 1B:
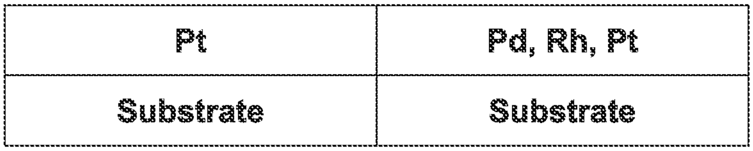
FIG. 1B is a schematic representation of the zoned catalytic article design with two pieces of substrate according to some embodiments of the present invention.

The present invention will be described in details hereinafter. It is to be understood that the present invention may be embodied in many different ways and shall not be construed as limited to the embodiments set forth herein.

The singular forms "a", "an" and "the" include plural referents unless the context clearly dictates otherwise. The terms "comprise", "comprising", etc. are used interchangeably with "contain", "containing", etc. and are to be interpreted in a non-limiting, open manner. That is, e.g., further components or elements may be present. The expressions "consists of" or "consists essentially of" or cognates may be embraced within "comprises" or cognates.

As used herein, the terms "palladium component", "platinum component" and "rhodium component" are intended to describe the presence of those platinum group metals in any possible valence state, which may be for example respective metal or the metal oxide as the catalytically active form, or may be for example respective metal compound, complex, or the like which, upon calcination or use of the catalyst, decomposes or otherwise converts to a catalytically active form.

According to the first aspect of the present invention, a zoned catalytic article, particularly useful for TWC is provided, which comprises:

a) a catalyst composition coat comprising
   i. a first zone of the catalyst composition, comprising a platinum group metal component consisting of a platinum component supported on a support; and
   ii. a second zone of the catalyst composition coat, comprising a rhodium component and at least one of a platinum component and a palladium component supported individually or together on a support, and b) a substrate;

wherein the first zone and the second zone of the catalyst composition coat are carried on a single piece of substrate or carried on respective pieces of substrate.

It is to be understood that the first zone and the second zone of the catalyst composition coat in the zoned catalytic article according to the present invention are adjacent to each other in the longitudinal direction of the substrate, which may be exactly adjoining, but may also non-intentionally be interrupted with a gap for example in the case that the two zones are carried on two pieces of substrate, or non-intentionally be overlapped for example in the case that the two zones are carried on a single piece of substrate.

It is to be further understood that, in the case that the first zone and the second zone of the catalyst composition coat are carried on respective pieces of substrate, the pieces of substrate are arranged longitudinally such that the exhaust gas to be treated passes through each piece of substrate sequentially.

The terms "first" and "second" within the context are not intended to indicate the relative position of the two zones and shall not be understood as restrictions to the relative position of the two zones, with respect to the exhaust flow direction.

The first zone of the catalyst composition coat may be arranged upstream or downstream from the second zone. In some embodiments, the first zone is arranged upstream. In alternative embodiments, the second zone is arranged upstream. Herein, the zone arranged upstream from the other is called "front zone", i.e., the zone which an exhaust stream from an engine will contact with prior to the other zone. Accordingly, the zone arranged downstream is called rear zone, i.e., the zone which the exhaust stream flowing from the front zone will contact with.

The first zone of the catalyst composition coat (also abbreviated as the first zone hereinafter) is substantially free of any platinum group metals (PGMs) other than Pt. In other words, the platinum component is the only one platinum group metal component in the first zone.

In some embodiments, the first zone may be layered, for example including a top layer and a bottom layer each containing the platinum component supported on one or more supports.

The second zone of the catalyst composition coat (also abbreviated as the second zone hereinafter) may comprise the rhodium component and the at least one of a platinum component and a palladium component as the major platinum group metal components. The term "major" as used herein refers to an amount of more than 50%, for example more than 60%, or 70%, or 80% or 90% or more based on the total loading of platinum group metal components in the zone. Particularly, the second zone may be substantially free of any PGMs other than platinum, palladium and rhodium.

In some embodiments, the second zone may be layered, for example including a top layer and a bottom layer each containing one or more platinum group metal component selected from the rhodium component and the at least one of a platinum component and a palladium component, supported on respective supports. The different platinum group metal components in the same one layer may be supported individually or together on one or more supports.

In some further embodiments, the second zone includes a top layer and a bottom layer wherein the top layer contains a rhodium component and at lease one of a platinum component and a palladium component supported individually or together on one or more supports, and the bottom layer contains a platinum component supported on one or more supports. For example, the second zone includes a top layer and a bottom layer wherein the top layer contains a platinum component, a palladium component and a rhodium component supported individually or together on one or more supports, and the bottom layer contains a platinum component supported on one or more supports. Particularly, in the second zone, the top layer is substantially free of any PGMs other than platinum, palladium and rhodium, and/or the bottom layer is substantially free of any PGMs other than platinum.

Herein, reference to a zone or layer that is substantially free of a PGM is intended to mean no PGM as specified has been intentionally added or used in the zone or layer. It will be appreciated by those of skill in the art that trace amounts of the impurity PGM from raw materials may impossibly avoided. Moreover, migration of trace amounts of PGM(s) into the zone or layer may inadvertently occur during loading, coating and/or calcining, such that trace amounts of the specified PGM(s) may be present in the zone or layer. There is generally less than 1 wt %, including less than 0.75 wt %, less than 0.5 wt %, less than 0.25 wt %, or less than 0.1 wt %, of the specified PGM(s).

Within the context of the present invention, "support" refers to a material receiving and carrying one or more platinum group metal components, which may also receive and carry other components such as stabilizers, promoters and binders.

It is to be understood that the supports for the platinum component, the palladium component and the rhodium component in the catalyst composition coat may be the same or different. Moreover, more than one platinum group metal components may be supported on the same support when multiple platinum group metals are present in the same one coat layer. It is also to be understood that the supports for the same platinum group metal components in different layers or in different zones in the catalyst composition coat may be the same or different.

As useful supports for the PGM components in the zoned catalytic article according to the present invention, refractory metal oxides, oxygen storage components and any combinations thereof may be mentioned.

The refractory metal oxide, a widely used support for platinum group metal components in catalytic articles for exhaust treatment, is generally a high surface area alumina-based material, zirconia-based material or a combination thereof. Within the context of the present invention, "alumina-based material" refers to a material comprising alumina as a base and optionally a dopant. Similarly, "zirconia-based material" refers to a material comprising zirconia as a base and optionally a dopant.

Suitable examples of the alumina-based materials include, but are not limited to alumina, for example a mixture of the gamma and delta phases of alumina which may also contain substantial amounts of eta, kappa and theta alumina phases, lanthana doped alumina, baria doped alumina, ceria doped alumina, zirconia doped alumina, ceria-zirconia doped alumina, lanthana-zirconia doped alumina, baria-lanthana doped alumina, baria-ceria doped alumina, baria-zirconia doped alumina, baria-lanthana-neodymia doped alumina, lanthana-ceria doped alumina, and any combinations thereof. Suitable examples of the zirconia-based materials include, but are not limited to zirconia, lanthana doped zirconia, yttria doped zirconia, neodymia doped zirconia, praseodymia doped zirconia, litania doped zirconia, titania-lanthana doped zirconia, lanthana-yttria doped zirconia, and any combinations thereof.

Particularly, the refractory metal oxide useful as the support may be selected from baria doped alumina, lanthana doped alumina, ceria doped alumina, lanthana-zirconia doped alumina, baria-ceria doped alumina, and any combinations thereof.

Generally, the amount of the refractory metal oxide is 10 to 90 wt. %, based on the total weight of a single coat layer.

The oxygen storage component (OSC) refers to an entity that has a multi-valence state and can actively react with oxidants such as oxygen or nitrogen oxides under oxidative conditions, or reacts with reductants such as carbon monoxide (CO) or hydrogen under reduction conditions. Typically, the OSC comprises one or more reducible rare earth metal oxides, such as ceria. The OSC may also comprise one or more of lanthana, praseodymia, neodymia, europia, samaria, ytterbia, yttria, zirconia, hafnia, and any combinations thereof to constitute a composite oxide with ceria. Preferably, the oxygen storage component is selected from ceria-zirconia composite oxide and stabilized ceria-zirconia composite oxide. Generally, the amount of oxygen storage component is 20 to 80 wt. %, based on the total weight of a single coat layer.

In some particular embodiments, the zoned catalytic article according to the present invention comprises:

a) a catalyst composition coat comprising
   i. a first zone of the catalyst composition coat, including a top layer and a bottom layer, wherein each layer comprises a platinum group metal component consisting of a platinum component supported on one or more supports,
   ii. a second zone of the catalyst composition coat, including a top layer and a bottom layer, wherein the top layer contains a platinum component, a palladium component and a rhodium component supported individually or together on one or more supports, and the bottom layer contains a platinum component supported on one or more supports;

and b) a substrate, wherein the first zone and the second zone of the catalyst composition coat are carried on a single piece of substrate or carried on respective pieces of substrate.

In some more particular embodiments, the zoned catalytic article according to the present invention comprises:

a) a catalyst composition coat comprising
   i. a first zone of the catalyst composition coat, including a top layer and a bottom layer, wherein
   the top layer comprises a platinum group metal component consisting of a platinum component supported on a refractory metal oxide and an oxygen storage component;
   the bottom layer comprises a platinum group metal component consisting of a platinum component supported on a refractory metal oxide,
   ii. a second zone of the catalyst composition coat, including a top layer and a bottom layer, wherein
   the top layer contains a palladium component supported on a refractory metal oxide, a rhodium component supported on a refractory metal oxide and an oxygen storage component, and a platinum component supported on respective supports of the palladium component and the rhodium component;
   the bottom layer contains a platinum component supported on a refractory metal oxide and an oxygen storage component; and b) a substrate, wherein the first zone and the second zone of the catalyst composition coat are carried on a single piece of substrate or carried on respective pieces of substrate.

In some further embodiments, the zoned catalytic article according to the present invention comprises:

a) a catalyst composition coat comprising
   i. a first zone of the catalyst composition coat, including a top layer and a bottom layer, wherein
   the top layer comprises a platinum group metal component consisting of a platinum component supported on a refractory metal oxide selected from ceria doped alumina and an oxygen storage component selected from ceria-zirconia composite oxide;
   the bottom layer comprises a platinum group metal component consisting of a platinum component supported on a refractory metal oxide selected from baric-ceria doped alumina,
   ii. a second zone of the catalyst composition coat, including a top layer and a bottom layer, wherein
   the top layer contains a palladium component supported on a refractory metal oxide selected from baria doped alumina, a rhodium component supported on a refractory metal oxide selected from lanthana-zirconia doped alumina and an oxygen storage component selected from ceria-zirconia composite oxide, and a platinum component supported on respective supports of the palladium component and the rhodium component;

the bottom layer contains a platinum component supported on a refractory metal oxide selected from ceria doped alumina and an oxygen storage component selected from ceria-zirconia composite oxide; and b) a substrate, wherein the first zone and the second zone of the catalyst composition coat are carried on a piece of substrate or carried on respective pieces of substrate.

In some embodiments as described hereinabove, the platinum component in the first zone may be loaded in an amount of 1 to 250 g/ft$^3$, or 5 to 150 g/ft$^3$, or 10 to 100 g/ft$^3$, or 30 to 80 g/ft$^3$, or 40 to 70 g/ft$^3$, calculated as platinum element.

Moreover, in some embodiments wherein the first zone includes a top layer and a bottom layer as described hereinabove, the platinum component may be loaded in the top layer and in the bottom layer of the first zone at a weight ratio in the range of 1:10 to 10:1, or 1:5 to 10:1, or 1:2 to 5:1, or 1:1 to 3:1.

In some embodiments as described hereinabove, the PGM components in the second zone may be loaded in a total amount of 1 to 250 g/ft$^3$, or 5 to 150 g/ft$^3$, or 10 to 100 g/ft$^3$, or 30 to 80 g/ft$^3$, or 40 to 70 g/ft$^3$, calculated as respective PGM element.

The rhodium component in the second zone may be loaded for example in an amount of 0.5 to 90 wt %, or 0.5 to 70 wt %, or 0.5 to 50 wt %, or 1 to 20 wt %, or 3 to 10 wt % based on the total loading of the PGM components in the second zone. The weight ratio of the palladium component to the platinum component if both are present in the second zone may be for example in the range of 1:10 to 10:1, or 1:5 to 5:1, or 1:3 to 3:1, or 1:2 to 2:1, calculated as respective elements.

Moreover, in some embodiments wherein the second zone includes a top layer and a bottom layer both comprising the platinum component, the platinum component may be loaded in the top layer and in the bottom layer of the first zone at a weight ratio in the range of 1:10 to 10:1, 1:5 to 3:1, or 1:3 to 2:1, or 2:3 to 1:1.

In some embodiments as described hereinabove, the ratio of the total Pt loading in the first zone and the total PGM loading in the second zone are for example in the range of 1:10 to 10:1, or 5:1 to 1:5, or 4:1 to 1:4, or 3:1 to 1:3, or 2:1 to 1:1. Alternatively or additionally, the first zone and the second zone extend at a length ratio of 1:10 to 10:1, or 5:1 to 1:5, or 4:1 to 1:4, or 3:1 to 1:3, or 2:1 to 1:1. The length refers to the length of the part of substrate on which the zone extends when the two zones are carried on a single piece of substrate, or the length of the respective substrate on which the zone extends when the two zones are carried on two pieces of substrate respectively.

Generally, a total loading of the first zone may be in the range of 0.2 to 5.0 g/in$^3$ or 1.0 to 4.0 g/in$^3$, or 1.5 to 3.0 g/in$^3$. Alternatively or additionally, a total loading of the second zone may be in the range of 0.2 to 10.0 g/in$^3$ or 1.0 to 5.0 g/in$^3$, or 1.5 to 3.0 g/in$^3$.

The catalyst composition coat optionally comprises a stabilizer and/or a promoter as desired. Suitable stabilizer includes non-reducible oxides of metals selected from the group consisting of barium, calcium, magnesium, strontium and mixtures thereof. Preferably, one or more oxides of barium and/or magnesium are used as the stabilizer. Suitable promoter includes non-reducible oxides of rare earth metals selected from the group consisting of lanthanum, praseodymium, yttrium, cerium, tungsten, neodymium, gadolinium, samarium, hafnium and mixtures thereof.

In some embodiments wherein top and bottom layers are included in a zone as described hereinabove, the bottom layer is carried on the substrate and the top layer is carried on the bottom layer without any intermediate layers.

The first zone and the second zone of the catalyst composition coat are generally carried on the substrate in form of "washcoat". The term "washcoat" has its usual meaning in the art and refers to a thin, adherent coating of a catalytic or other material applied to a substrate. A washcoat is generally formed by preparing a slurry containing a certain solid content (e.g., 15-60% by weight) of particles in a liquid medium, which is then applied onto a substrate, dried and calcined to provide a washcoat layer.

The substrate as used herein refers to a structure that is suitable for withstanding conditions encountered in exhaust streams of combustion engines on which catalyst compositions carried, typically in the form of a washcoat. The substrate is generally a ceramic or metal honeycomb structure having fine, parallel gas flow passages extending from one end of the structure to the other.

Metallic materials useful for constructing the substrate may include heat resistant metals and metal alloys such as titanium and stainless steel as well as other alloys in which iron is a substantial or major component. Such alloys may contain one or more nickel, chromium, and/or aluminium, and the total amount of these metals may advantageously comprise at least 15 wt % of the alloy e.g. 10 to 25 wt % of chromium, 3 to 8% of aluminium, and up to 20 wt % of nickel. The alloys may also contain small or trace amounts of one or more metals such as manganese, copper, vanadium, titanium and the like. The surface of the metallic substrate may be oxidized at high temperature, e.g., 1000° C. and higher, to form an oxide layer on the surface of the substrate, improving the corrosion resistance of the alloy and facilitating adhesion of the washcoat layer to the metal surface.

Ceramic materials useful for constructing the substrate may include any suitable refractory material, e.g., cordierite, mullite, cordierite-alumina, silicon nitride, zircon mullite, spodumene, alumina-silica-magnesia, zircon silicate, sillimanite, magnesium silicates, zircon, petalite, alumina, and aluminosilicates.

Within the context of the present invention, a flow-through substrate is preferred, which has a plurality of fine, parallel gas flow passages extending from an inlet face to an outlet face of the substrate such that passages are open to fluid flow therethrough. The passages, which are essentially straight paths from their fluid inlet to their fluid outlet, are defined by walls on which the catalytic material is applied as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section. For example, the substrate may have from about 200 to 900, more usually from about 300 to 750, cells per square inch ("cpsi"). The wall thickness of flow-through substrates may vary, with a typical range from 1 mil to 0.1 inches.

It is also possible that the substrate is a wall flow substrate having a plurality of fine, parallel gas flow passages extending along from an inlet face to an outlet face of the substrate wherein alternate passages are blocked at opposite ends. The configuration requires the gas stream flow through the porous walls of the wall-flow substrate to reach the outlet face. The wall-flow substrates may contain up to about 700 cells per square inch (cpsi), for example about 100 to 400 cpsi and more typically about 200 to about 300 cpsi. The cross-sectional shape of the passages can vary as described above for the passages of the flow-through substrate. The wall thickness of wall-flow substrates may vary, with a typical range from 2 mils to 0.1 inches.

As used herein, a loading of a PGM is defined in g/ft$^3$, as the weight of the PGM metal in the catalyst per unit volume of the substrate. A coat loading is defined in g/in$^3$, as the total weight of all components of the catalyst composition coat (i.e., PGM, support, binder, etc.) per unit volume of the substrate.

The zoned catalytic article according to the present invention may be prepared by any conventional methods known in the art without any restrictions. Typically, a washcoating method may be adopted wherein a slurry comprising catalyst particles of supported PGM(s), optionally a stabilizer and/or promote or precursors thereof, a solvent (e.g. water), optionally a binder, and optionally auxiliaries such as surfactant, pH adjustor and thickener is applied onto a substrate.

The catalyst particles of supported PGM(s) may be prepared by impregnating precursors of the PGM(s) such as soluble salts and/or complex thereof via conventional techniques such as dry impregnation (also called incipient wetness impregnation or capillary impregnation) or wet impregnation on respective supports, optionally followed by drying and/or calcining. Suitable precursors of the PGMs may be selected from ammine complex salts, hydroxyl salts, nitrates, carboxylic acid salts, ammonium salts, and oxides. Non-limiting examples include palladium nitrate, tetraammine palladium nitrate, rhodium nitrate, tetraammine platinum acetate, and platinum nitrate, tetraammine platinum acetate and hexahydroxyplatinic acid diethanolamine salt ($(HOCH_2CH_2NH_3)_2[Pt(OH)_6]$).

The binder may be provided from alumina, boehmite, silica, zirconium acetate, colloidal zirconia, or zirconium hydroxide. When present, the binder is typically used in an amount of 0.5 to 5.0 wt % of the total washcoat loading.

The slurries may have a solid content for example in the range of 20 to 60 wt %, more particularly 30 to 50 wt. %. The slurries are often milled to reduce the particle size. Typically, the slurries may have a $D_{90}$ particle size of 3.0 to 40 microns, preferably 10 to 30 microns, more preferably less than 20 microns, after milling, as measured by laser diffraction particle size distribution analyser.

The applied slurry may be dried at an elevated temperature (e.g., 100 to 150° C.) for a period (e.g., 10 minutes to 3 hours) and calcined at a higher temperature (e.g., 400 to 700° C.) typically for about 10 minutes to about 3 hours to be deposited on the substrate. The washcoat loading after calcination can be determined through calculation of the weight difference between the coated and uncoated substrate. As will be apparent to those of skill in the art, the washcoat loading can be modified by altering the slurry rheology. In addition, the deposition process including coating, drying and calcining to generate a washcoat can be repeated as needed to build a layer to the desired loading level or thickness, which means more than one washcoat may be applied.

According to another aspect of the present invention, an exhaust treatment system is provided, which comprises the zoned catalytic article as described herein located downstream of an internal combustion engine, particularly a gasoline engine. In some embodiments, the exhaust treatment system is particularly useful for motorcycle.

According to a further aspect of the present invention, a method for treating an exhaust stream, particularly from motorcycle engine is provided, which includes contacting the exhaust stream with the zoned catalytic article or the exhaust treatment system as described herein.

As used herein, the terms "exhaust" and "exhaust stream" and the like refer to any engine effluent that may also contain particulate matter.

The zoned catalytic article and the exhaust treatment system according to the present invention is useful for abatement of hydrocarbons, carbon monoxide and nitrogen oxides, particularly hydrocarbons and carbon monoxide in an exhaust from a gasoline engine, especially from a motorcycle engine.

EMBODIMENTS

Embodiment 1

A zoned catalytic article, particularly useful for TWC, which comprises:

a) a catalyst composition coat comprising
  i. a first zone of the catalyst composition coat, comprising a platinum group metal component consisting of a platinum component supported on a support; and
  ii. a second zone of the catalyst composition coat, comprising a rhodium component and at least one of a platinum component and a palladium component supported individually or together on a support, and b) a substrate;

wherein the first zone and the second zone of the catalyst composition coat are carried on a single piece of substrate or carried on respective pieces of substrate.

Embodiment 2

The zoned catalytic article according to embodiment 1, wherein the first zone is arranged upstream or downstream, preferably upstream from the second zone.

Embodiment 3

The zoned catalytic article according to any of preceding embodiments, wherein the second zone comprises the rhodium component and the at least one of a platinum component and a palladium component as the major platinum group metal components, preferably substantially free of any PGMs other than platinum, palladium and rhodium.

Embodiment 4

The zoned catalytic article according to any of preceding embodiments, wherein the second zone comprises a rhodium component, a platinum component and a palladium component.

Embodiment 5

The zoned catalytic article according to any of preceding embodiments, wherein the second zone includes a top layer and a bottom layer each containing one or more platinum group metal component selected from the rhodium component and the at least one of a platinum component and a palladium component, supported on respective supports.

Embodiment 6

The zoned catalytic article according to any of preceding embodiments, wherein the second zone includes a top layer and a bottom layer and wherein the top layer contains a rhodium component and at least one of a platinum component and a palladium component supported individually or together on one or more supports, and the bottom layer contains a platinum component supported on one or more supports.

Embodiment 7

The zoned catalytic article according to any of preceding embodiments, wherein the second zone includes a top layer and a bottom layer and wherein the top layer contains a platinum component, a palladium component and a rhodium component supported individually or together on one or more supports, and the bottom layer contains a platinum component supported on one or more supports.

Embodiment 8

The zoned catalytic article according to any of preceding embodiments, wherein the first zone comprises a top layer and a bottom layer each containing the platinum group metal component supported on one or more supports.

Embodiment 9

The zoned catalytic article according to any of preceding embodiments, wherein the support for each of the platinum component, palladium component and rhodium component is independently selected from refractory metal oxides, oxygen storage components and any combinations thereof.

Embodiment 10

The zoned catalytic article according to embodiment 9, wherein the refractory metal oxide is selected from baric doped alumina, lanthana doped alumina, ceria doped alumina, lanthana-zirconia doped alumina, baria-ceria doped alumina, and any combinations thereof.

Embodiment 11

The zoned catalytic article according to embodiment 9, wherein the oxygen storage component is selected from ceria-zirconia composite oxide and stabilized ceria-zirconia composite oxide.

Embodiment 12

The zoned catalytic article according to any of preceding embodiments, wherein the zoned catalytic article comprises:

a) a catalyst composition coat comprising
 i. a first zone of the catalyst composition coat, including a top layer and a bottom layer, wherein each layer comprises a platinum group metal component consisting of a platinum component supported on one or more supports, and
 ii. a second zone of the catalyst composition coat, including a top layer and a bottom layer, wherein the top layer contains a platinum component, a palladium component and a rhodium component supported individually or together on one or more supports, and the bottom layer contains a platinum component supported on one or more supports;

and b) a substrate, wherein the first zone and the second zone of the catalyst composition coat are carried on a single piece of substrate or carried on respective pieces of substrate.

Embodiment 13

The zoned catalytic article according to any of preceding embodiments, wherein the zoned catalytic article comprises:

a) a catalyst composition coat comprising
 i. a first zone of the catalyst composition coat, including a top layer and a bottom layer, wherein
 the top layer comprises a platinum group metal component consisting of a platinum component supported on a refractory metal oxide and an oxygen storage component;
 the bottom layer comprises a platinum group metal component consisting of a platinum component supported on a refractory metal oxide,
 ii. a second zone of the catalyst composition coat, including a top layer and a bottom layer, wherein
 the top layer contains a palladium component supported on a refractory metal oxide, a rhodium component supported on a refractory metal oxide and an oxygen storage component, and a platinum component supported on respective supports of the palladium component and the rhodium component;
 the bottom layer contains a platinum component supported on a refractory metal oxide and an oxygen storage component;

and b) a substrate, wherein the first zone and the second zone of the catalyst composition coat are carried on a single piece of substrate or carried on respective pieces of substrate.

Embodiment 14

The zoned catalytic article according to any of preceding embodiments, wherein the zoned catalytic article comprises:

a) a catalyst composition coat comprising
 i. a first zone of the catalyst composition coat, including a top layer and a bottom layer, wherein
 the top layer comprises a platinum group metal component consisting of a platinum component supported on a refractory metal oxide selected from ceria doped alumina and an oxygen storage component selected from ceria-zirconia composite oxide;
 the bottom layer comprises a platinum group metal component consisting of a platinum component supported on a refractory metal oxide selected from baric-ceria doped alumina,
 ii. a second zone of the catalyst composition coat, including a top layer and a bottom layer, wherein
 the top layer contains a palladium component supported on a refractory metal oxide selected from bails doped alumina, a rhodium component supported on a refractory metal oxide selected from lanthana-zirconia doped alumina and an oxygen storage component selected from ceria-zirconia composite oxide, and a platinum component supported on respective supports of the palladium component and the rhodium component;

the bottom layer contains a platinum component supported on a refractory metal oxide selected from ceria doped alumina and an oxygen storage component selected from ceria-zirconia composite oxide;

and b) a substrate, wherein the first zone and the second zone of the catalyst composition coat are carried on a piece of substrate or carried on respective pieces of substrate.

Embodiment 15

The zoned catalytic article according to any of preceding embodiments, wherein the platinum component in the first zone is loaded in an amount of 1 to 250 $g/ft^3$, or 5 to 150 $g/ft^3$, or 10 to 100 $g/ft^3$, or 30 to 80 $g/ft^3$, or 40 to 70 $g/ft^3$, calculated as platinum element.

Embodiment 16

The zoned catalytic article according to any of preceding embodiments 3 to 15, wherein the platinum component is loaded in the top layer and in the bottom layer of the first zone at a weight ratio in the range of 1:10 to 10:1, or 1:5 to 10:1, or 1:2 to 5:1, or 1:1 to 3:1.

Embodiment 17

The zoned catalytic article according to any of preceding embodiments, wherein the PGM components in the second zone are loaded in a total amount of 1 to 250 $g/ft^3$, or 5 to 150 $g/ft^3$, or 10 to 100 $g/ft^3$, or 30 to 80 $g/ft^3$, or 40 to 70 $g/ft^3$, calculated as respective PGM element.

Embodiment 18

The zoned catalytic article according to any of preceding embodiments, wherein the rhodium component in the second zone is loaded in an amount of 0.5 to 90 wt %, 0.5 to 70 wt %, or 0.5 to 50 wt %, or 1 to 20 wt %, or 3 to 10 wt % based on the total loading of the PGM components in the second zone.

Embodiment 19

The zoned catalytic article according to any of preceding embodiments, wherein the ratio of the total Pt loading in the first zone and the total PGM loading in the second zone are in the range of 1:10 to 10:1, or 5:1 to 1:5, or 4:1 to 1:4, or 3:1 to 1:3, or 2:1 to 1:1.

Embodiment 20

The zoned catalytic article according to any of preceding embodiments, wherein the substrate is a flow-through substrate or a wall-flow substrate.

Embodiment 21

An exhaust treatment system, which comprises the zoned catalytic article as defined in any of embodiments 1 to 20 located downstream of an internal combustion engine, particularly a gasoline engine.

Embodiment 22

The exhaust treatment system according to embodiment 21, which is for motorcycle.

Embodiment 23

A method for treating an exhaust stream, particularly from motorcycle engine, which includes contacting the exhaust stream with the zoned catalytic article as defined in any of embodiments 1 to 20 or the exhaust treatment system as defined in embodiments 21 or 22.

Embodiment 24

Use of the zoned catalytic article as defined in any of embodiments 1 to 20 or the exhaust treatment system as defined in embodiments 21 or 22 for abatement of hydrocarbons, carbon monoxide and nitrogen oxides, particularly hydrocarbons and carbon monoxide in an exhaust stream from a gasoline engine, especially from a motorcycle engine.

EXAMPLES

Aspects of the present invention are more fully illustrated by the following examples, which are set forth to illustrate certain aspects of the present invention and are not to be construed as limiting thereof.

Example 1.1

Preparation of a Catalyst Module Comprising Only Pt as the PGM Bottom Coat Slurry 29.1 grams of 16% aqueous hexahydroxyplatinic acid diethanolamine ($(MEA)_2Pt(OH)_6$) solution was impregnated onto 354 grams of baric-ceria-alumina (16/41/43) powder via incipient wetness impregnation, and then the obtained powder was added in a solution containing 111 grams of DI water, 20.0 grams of acetic acid, 50.2 grams of 29.6% zirconium acetate aqueous solution and 100.4 grams of 30% magnesium acetate aqueous solution with continuous stirring and the pH adjusted to 5.5~6.5 by acetic acid. After that, 19.8 grams of alumina binder was added, and the powders were milled to a $D_{90}$ between 14 and 16 microns.

Top Coat Slurry:

35.2 grams of 16% aqueous $(MEA)_2Pt(OH)_6$ solution was impregnated onto 192 grams of ceria-alumina (8/92) powder, and 15.1 grams of 16% aqueous $(MEA)_2Pt(OH)_6$ solution was impregnated onto 108 grams of ceria-zirconia(40/60) powder, via incipient wetness impregnation, and then the obtained powders were added in a solution containing 118 grams of D.I. water and 14 grams of acetic acid with the powders being milled to a $D_{90}$ between 10 and 12 microns. After that, 84 grams of 28.5% cerium nitrate solution and 36.8 grams of alumina binders were added to the solution with the pH adjusted to 4~5 using acetic acid.

Figure 2A:
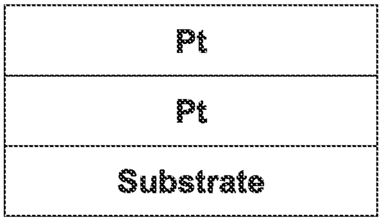
FIG. 2A is a schematic representation of the first zone comprising only platinum component with an exemplary layered configuration according to some embodiments of the present invention.

Catalyst Module:

The bottom coat slurry was coated onto a 300/2 (cpsi/mil) flow-through metallic substrate with diameter of 42 mm and length of 110 mm, dried at 150° C. for 1 hour and then calcined at 500° C. for 2 hours. The bottom coat was obtained with a washcoat loading of 1.0 $g/in^3$ and the Pt loading of the bottom coating is 20 $g/ft^3$. The top coat slurry was then applied, dried at 150° C. for 1 hour and then calcined at 500° C. for 2 hours. The top coat was obtained with a washcoat loading of 1.0 $g/in^3$ and the PGM loading of the top coat is 40 $g/ft^3$ Pt. A schematic representation of this module is provided in FIG. 2A.

Example 1.2

Preparation of a Catalyst Module Comprising Pt, Pd and Rh as the PGMs (Pt/Pd/Rh=10/10/1)

Bottom Coat Slurry: 15.6 grams of 16% aqueous $(MEA)_2Pt(OH)_6$ solution was impregnated onto 80 grams of ceria-alumina(8/92) powder and 266 grams of ceria-zirconia (55/45) powder via incipient wetness impregnation. The product was mixed with water and then 49 grams of barium sulfate powder and 44 grams of alumina binder were added. The pH was then adjusted around 3.5~4.5 by addition of nitric acid.

Top Coat Slurry:

A first component was prepared by impregnating 21.1 grams of 20% aqueous Pd-nitrate solution and 23.9 grams of 30% aqueous La-nitrate solution subsequently onto 209 grams of barium-alumina (10/90) powder via incipient wetness impregnation.

A second component was prepared by impregnating 4.25 grams of 10% aqueous Rh-nitrate solution onto 26 grams of lanthanum-zirconia-alumina (3/20/77) powder and 79 grams of ceria-zirconia (32/68) powder via incipient wetness impregnation.

11.2 grams of 16% aqueous $(MEA)_2Pt(OH)_6$ solution was diluted in water and then the first and second components were added with the pH adjusted to 4~5 by addition of nitric acid. Then the slurry was milled to a $D_{90}$ between 18 and 22 microns and 6.2 grams of barium sulfate powders were added. After that, 95.9 grams of alumina binder was added with the slurry pH was further adjusted to 3.5~4.5 by addition of nitric acid, followed by addition of 3.7 grams of zirconium acetate solution.

Figure 2B:
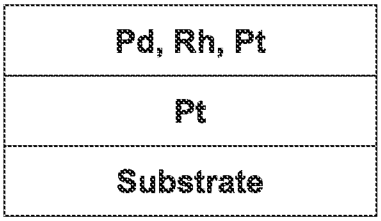
FIG. 2B is a schematic representation of the second zone comprising platinum, palladium and rhodium components with an exemplary layered configuration according to some embodiments of the present invention.

Catalyst Module:

The bottom coat slurry was coated onto a 300 cpsi/2 (cpsi/mil) flow-through metallic substrate with diameter of 42 mm and length of 110 mm, dried at 150° C. for 1 hour and then calcined at 500° C. for 2 hours. The bottom coat was obtained with a washcoat loading of 1.53 $g/in^3$ and the Pt loading of the bottom coating is 16.5 $g/ft^3$. The top coat slurry was then applied, dried at 150° C. for 1 hour and then calcined at 500° C. for 2 hours. The top coat was obtained with a washcoat loading of 1.37 $g/in^3$ and the PGM loading of the top coat consists of 12 $g/ft^3$ Pt, 28.5 $g/ft^3$ Pd and 3 $g/ft^3$ Rh. A schematic representation of this module is provided in FIG. 2B.

Example 2

Preparation of Test Samples

Test samples with the zone arrangements as shown in Table 1 below were prepared by accommodate respective modules into a housing with an inlet and an outlet for the gas to be treated.

TABLE 1

| Arrangement of Zones | | |
|---|---|---|
| Sample No. | Front Zone (inlet zone) | Rear Zone (outlet zone) |
| 1 | Module from Example 1.1 | Module from Example 1.2 |
| 2 | Module from Example 1.2 | Module from Example 1.1 |
| 3 | Module from Example 1.2 | Module from Example 1.2 |

Figure 3:
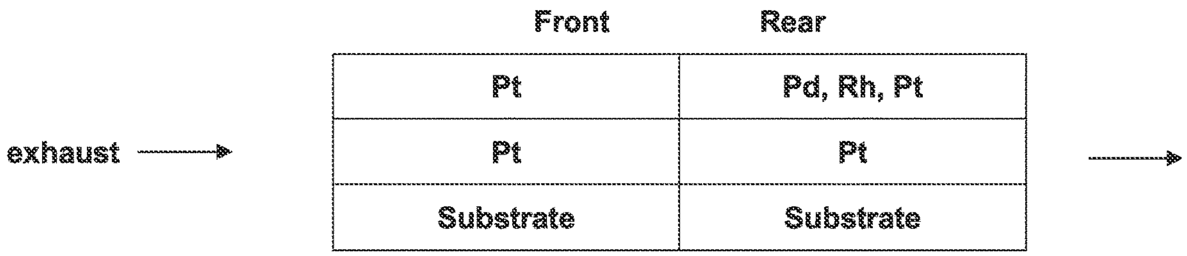
FIG. 3 is a schematic representation of the zoned catalytic article design with an exemplary layered configuration of Sample 1 as illustrated in Examples.
Figure 4:
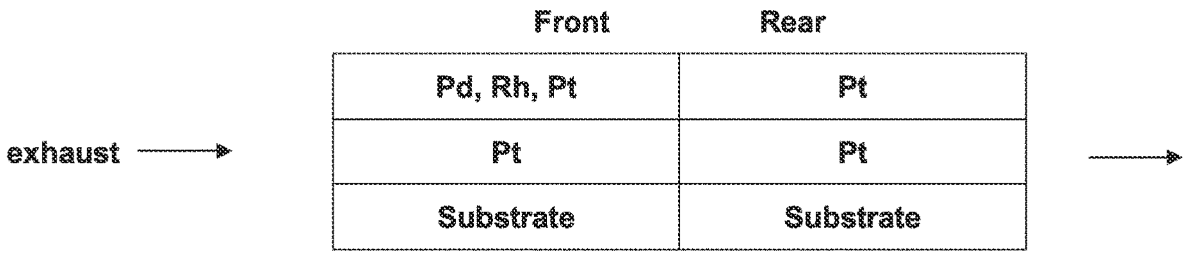
FIG. 4 is a schematic representation of the zoned catalytic article design with an exemplary layered configuration of Sample 2 as illustrated in Examples.
Figure 5:
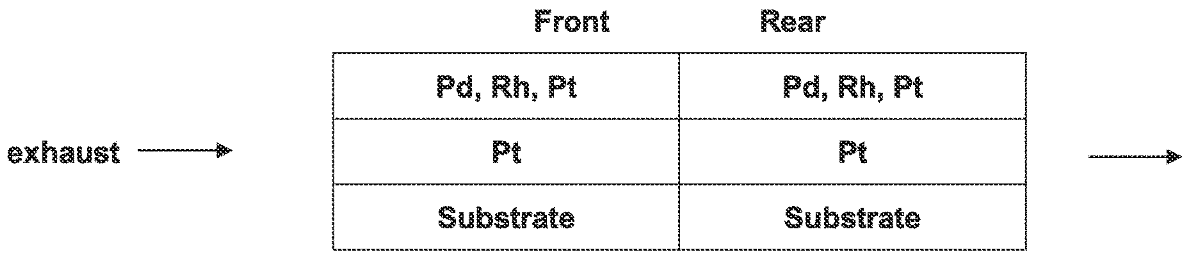
FIG. 5 is a schematic representation of the zoned catalytic article design with an exemplary layered configuration of Sample 3 as illustrated in Examples.

The configurations of samples 1 to 3 are schematically shown in FIGS. 3 to 5 respectively.

Example 3

Catalytic Performance Test

The catalytic performance test was performed for test samples in both fresh and aged state. The aging was carried out on a 650 cc motorcycle engine at the sample inlet temperature of 780° C. for 30 hours.

The test was carried out on a 100 cc motorbike using the World Motorcycle Test Cycle (WMTC) in accordance with GB14622-2016, Type I. The performance of the test samples was evaluated by measuring the tail-pipe total hydrocarbons (THC), CO and NOx emissions from following two phases included in one test cycle:

P1: Cold start phase from 0 to 600 seconds,

P2: Hot phase from 600 to 1200 seconds.

The exhausts from the two phases have following accumulative compositions under fuel consumption of 2.03 L/100 km:

P1: 2.350 g/km CO, 0.410 g/km THC, 0.471 g/km NOx,

P2: 1.471 g/km CO; 0.312 g/km THC; 0.514 g/km NOx.

Each sample was tested three times to provide an average as the test result, as shown in Tables 2 to 4.

TABLE 2

| Tail-pipe THC Emissions (g/km) | | | | | | |
|---|---|---|---|---|---|---|
| | Fresh | | | Aged | | |
| THC | Sample 1 | Sample 2 | Sample 3 | Sample 1 | Sample 2 | Sample 3 |
| P1 Avg. | 0.0702 | 0.0702 | 0.0736 | 0.0742 | 0.0753 | 0.0780 |
| P2 Avg. | 0.0090 | 0.0106 | 0.0108 | 0.0120 | 0.0113 | 0.0140 |
| Psum Avg. | 0.0792 | 0.0808 | 0.0845 | 0.0862 | 0.0866 | 0.0920 |

TABLE 3

| Tail-pipe CO Emissions (g/km) | | | | | | |
|---|---|---|---|---|---|---|
| | Fresh | | | Aged | | |
| CO/10 | Sample 1 | Sample 2 | Sample 3 | Sample 1 | Sample 2 | Sample 3 |
| P1 Avg. | 0.04349 | 0.04889 | 0.05421 | 0.03560 | 0.04947 | 0.05244 |
| P2 Avg. | 0.00078 | 0.00085 | 0.00149 | 0.00148 | 0.00118 | 0.00243 |
| Psum Avg. | 0.04427 | 0.04973 | 0.05571 | 0.03708 | 0.05065 | 0.05487 |

TABLE 4

| Tail-pipe NOx Emissions (g/km) | | | | | | |
|---|---|---|---|---|---|---|
| | Fresh | | | Aged | | |
| NOx | Sample 1 | Sample 2 | Sample 3 | Sample 1 | Sample 2 | Sample 3 |
| P1 Avg. | 0.00743 | 0.00748 | 0.00695 | 0.01725 | 0.01309 | 0.01127 |
| P2 Avg. | 0.00105 | 0.00545 | 0.00386 | 0.00317 | 0.00454 | 0.00210 |

TABLE 4-continued

| Tail-pipe NOx Emissions (g/km) | | | | | | |
|---|---|---|---|---|---|---|
| | Fresh | | | Aged | | |
| NOx | Sample 1 | Sample 2 | Sample 3 | Sample 1 | Sample 2 | Sample 3 |
| Psum Avg. | 0.00848 | 0.01294 | 0.01081 | 0.02042 | 0.01763 | 0.01338 |

Figure 6:
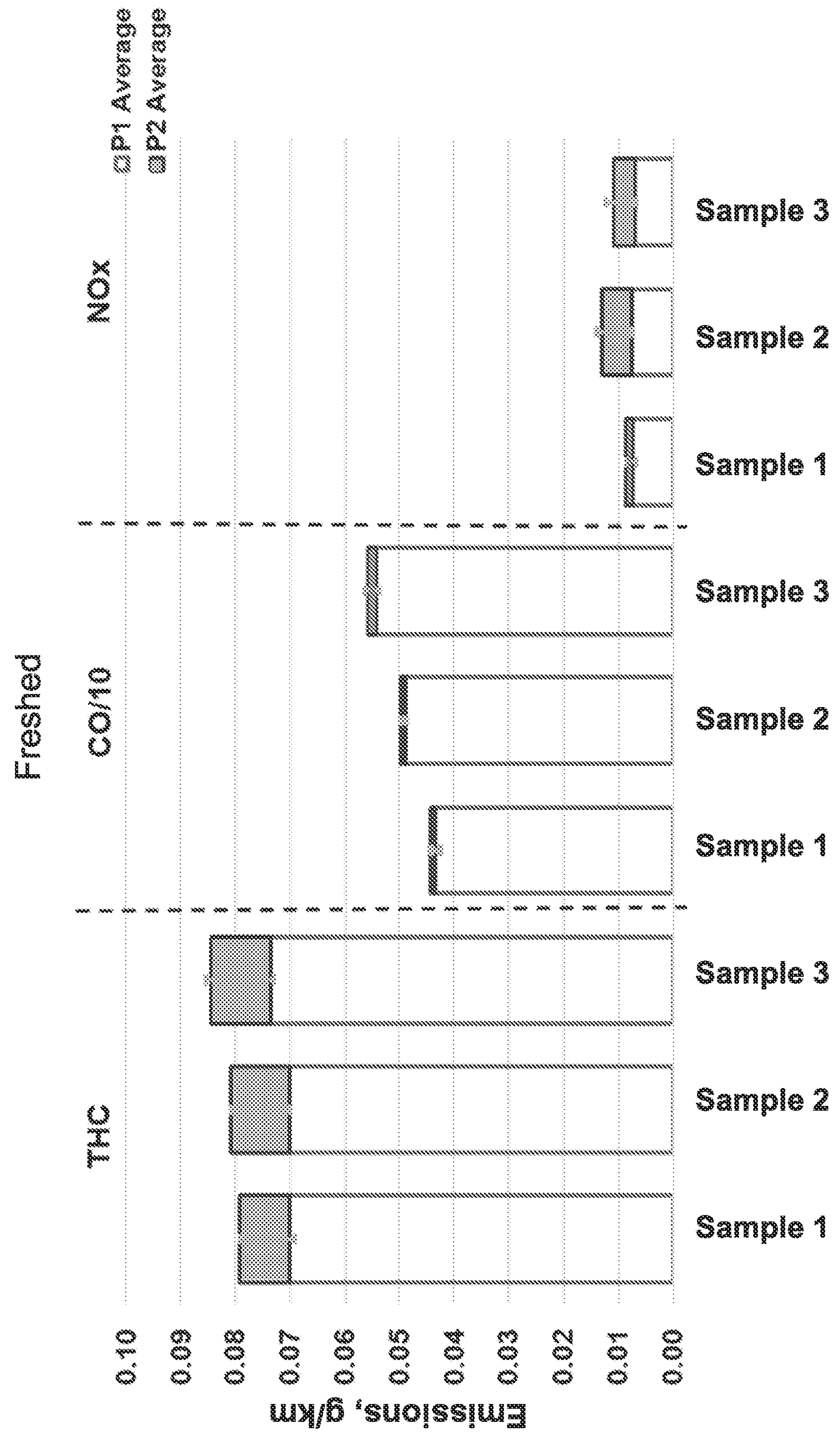
FIG. 6 is a graph showing tail-pipe emissions in terms of THC, CO and NOx after treatment of the engine exhaust with fresh Samples 1, 2 and 3 as illustrated in Examples.
Figure 7:
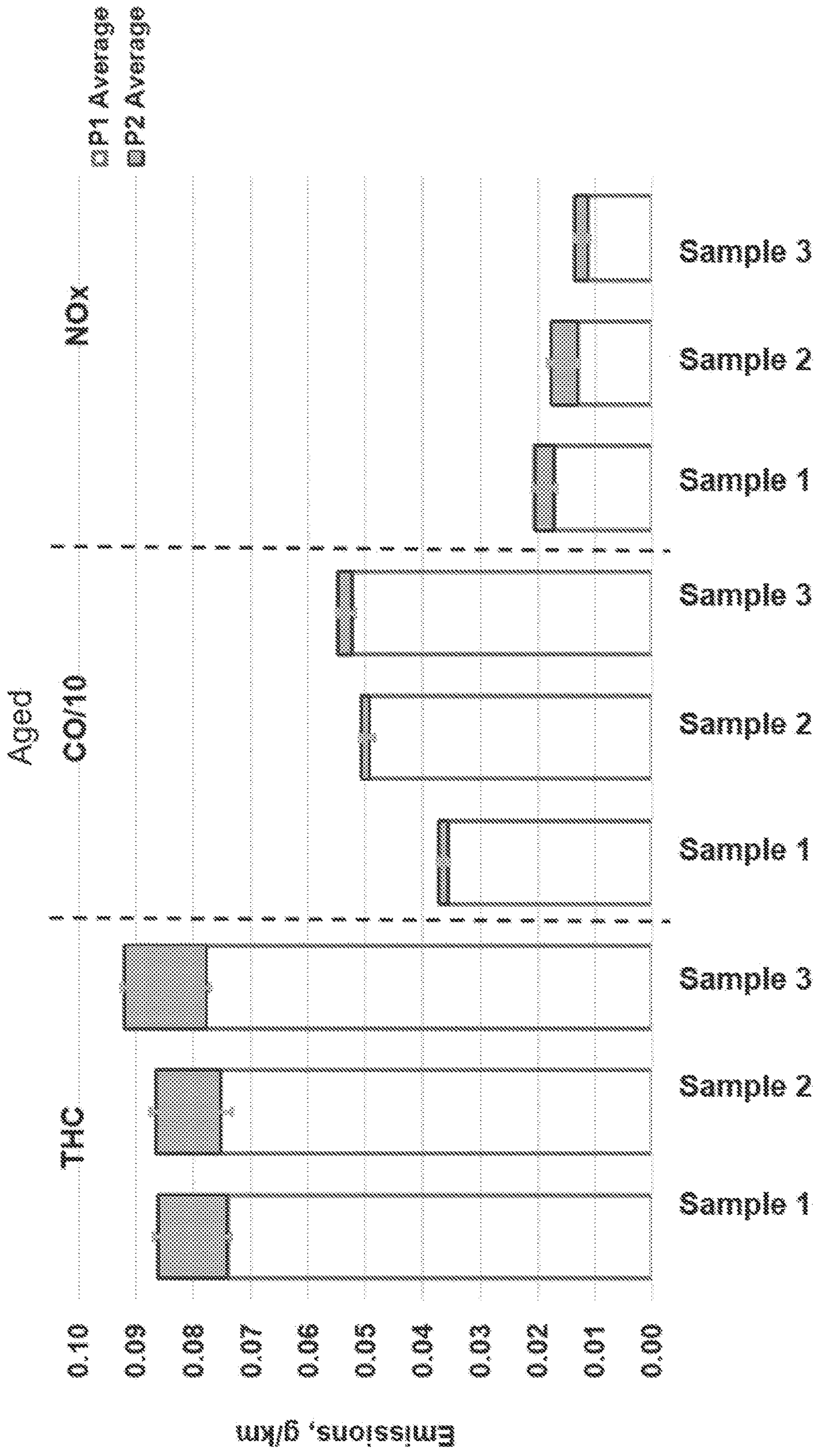
FIG. 7 is a graph showing tail-pipe emissions in terms of THC, CO and NOx after treatment of the engine exhaust with aged Samples 1, 2 and 3 as illustrated in Examples.

The test results of the emissions were also shown graphically in FIG. 6 for fresh samples and FIG. 7 for aged samples. It can be seen that the sample 1 and sample 2 which have a zone comprising only Pt as PGM according to the present invention perform superior to the sample 3 which does not have the zone comprising only Pt as the PGM, with respect to THC and CO abatements in both fresh and aged states. Moreover, the sample 1 in fresh state also performs superior to the sample 3 with respect to NOx abatement.

It was known that Pt and Pd are responsible for catalysis of HC and CO oxidation and Rh is responsible for catalysis of NOx reduction, and that Pt is less effective for oxidation of CO, unsaturated HC and methane, but more effective for $C_3^+$ HC than Pd. For that reason, the three PGMs Pt, Pd and Rh were generally used in combination in TWC. Moreover, it was believed that Pt is not suitable to be used alone in a TWC catalyst for gasoline engines due to the low resistance to the high temperature of the exhaust from gasoline engines. Thus, the finding of the present invention is surprising.

Also surprising is the fact that the catalytic performance, with respect to THC and CO abatements, of sample 1 having a front zone comprising only Pt as PGM and a rear zone comprising Pt, Pd and Rh is even better than the sample 2 having a reverse zone arrangement.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A zoned catalytic article, particularly useful for TWC, which comprises:

a) a catalyst composition coat comprising i. a first zone of the catalyst composition coat, comprising a top layer and a bottom layer, wherein the top layer comprises a platinum group metal component consisting of a platinum component supported on a refractory metal oxide selected from ceria doped alumina and an oxygen storage component selected from ceria-zirconia composite oxide;

the bottom layer comprises a platinum group metal component consisting of a platinum component supported on a refractory metal oxide selected from baria-ceria doped alumina, ii. a second zone of the catalyst composition coat, comprising a top layer and a bottom layer, wherein the top layer contains a palladium component supported on a refractory metal oxide selected from baria doped alumina, a rhodium component supported on a refractory metal oxide selected from lanthana-zirconia doped alumina and an oxygen storage component selected from ceria-zirconia composite oxide, and a platinum component supported on respective supports of the palladium component and the rhodium component;

the bottom layer contains a platinum component supported on a refractory metal oxide selected from ceria doped alumina and an oxygen storage component selected from ceria-zirconia composite oxide; and b) a substrate, wherein the first zone and the second zone of the catalyst composition coat are carried on a single piece of substrate or carried on respective pieces of substrate.

2. The zoned catalytic article according to claim 1, wherein the first zone is arranged upstream or downstream, and wherein the first zone is arranged upstream from the second zone.

3. The zoned catalytic article according to claim 1, wherein the second zone comprises the rhodium component and the at least one of a platinum component and a palladium component as the major platinum group metal components substantially free of any PGMs other than platinum, palladium and rhodium.

4. The zoned catalytic article according to claim 1, wherein the second zone includes a top layer and a bottom layer each containing one or more platinum group metal component selected from the rhodium component and the at least one of a platinum component and a palladium component, supported on respective supports.

5. The zoned catalytic article according to claim 1, wherein the second zone includes a top layer and a bottom layer and wherein the top layer contains a rhodium component and at least one of a platinum component and a palladium component supported individually or together on one or more supports, and the bottom layer contains a platinum component supported on one or more supports.

6. The zoned catalytic article according to claim 1, wherein the second zone includes a top layer and a bottom layer and wherein the top layer contains a platinum component, a palladium component and a rhodium component supported individually or together on one or more supports, and the bottom layer contains a platinum component supported on one or more supports.

7. The zoned catalytic article according to claim 1, wherein the first zone comprises a top layer and a bottom layer each containing the platinum group metal component supported on one or more supports.

8. The zoned catalytic article according to claim 1, wherein the support for each of the platinum component, palladium component and rhodium component is independently selected from refractory metal oxides, oxygen storage components and any combinations thereof.

9. The zoned catalytic article according to claim 8, wherein the refractory metal oxide is selected from baria doped alumina, lanthana doped alumina, ceria doped alumina, lanthana-zirconia doped alumina, baria-ceria doped alumina, and any combinations thereof, and wherein the oxygen storage component is selected from ceria-zirconia composite oxide and stabilized ceria-zirconia composite oxide.

10. The zoned catalytic article according to claim 1, wherein the zoned catalytic article comprises:

a) a catalyst composition coat comprising i a first zone of the catalyst composition coat, including a top layer and a bottom layer, wherein each layer comprises a platinum group metal component consisting of a platinum component supported on one or more supports, and ii. a second zone of the catalyst composition coat, including a top layer and a bottom layer, wherein the top layer contains a platinum component, a palladium component and a rhodium component supported individually or together on one or more supports, and the bottom layer contains a platinum component supported on one or more supports; and b) a substrate, wherein the first zone and the second zone of the catalyst composition coat are carried on a single piece of substrate or carried on respective pieces of substrate.

11. The zoned catalytic article according to claim 1, wherein the zoned catalytic article comprises:

a) a catalyst composition coat comprising i. a first zone of the catalyst composition coat, including a top layer and a bottom layer, wherein the top layer comprises a platinum group metal component consisting of a platinum component supported on a refractory metal oxide and an oxygen storage component;

the bottom layer comprises a platinum group metal component consisting of a platinum component supported on a refractory metal oxide, ii. a second zone of the catalyst composition coat, including a top layer and a bottom layer, wherein the top layer contains a palladium component supported on a refractory metal oxide, a rhodium component supported on a refractory metal oxide and an oxygen storage component, and a platinum component supported on respective supports of the palladium component and the rhodium component;

the bottom layer contains a platinum component supported on a refractory metal oxide and an oxygen storage component; and b) a substrate, wherein the first zone and the second zone of the catalyst composition coat are carried on a single piece of substrate or carried on respective pieces of substrate.

12. The zoned catalytic article according to claim 1, wherein the platinum component in the first zone is loaded in an amount of 1 to 250 g/ft$^3$, calculated as platinum element.

13. The zoned catalytic article according to claim 1, wherein the PGM components in the second zone are loaded in a total amount of 1 to 250 g/ft$^3$, calculated as respective PGM element.

14. The zoned catalytic article according to claim 1, wherein the rhodium component in the second zone is loaded in an amount of 0.5 to 90 wt % based on the total loading of the PGM components in the second zone.

15. The zoned catalytic article according to claim 1, wherein the ratio of the total Pt loading in the first zone and the total PGM loading in the second zone are in the range of 1:10 to 10:1.

16. The zoned catalytic article according to claim 1, wherein the substrate is a flow-through substrate or a wall-flow substrate.

17. An exhaust treatment system, which comprises the zoned catalytic article as defined in claim 1, located downstream of an internal combustion engine, particularly a gasoline engine.

18. The exhaust treatment system according to claim 17, which is for motorcycle.

19. A method for treating an exhaust stream, particularly from motorcycle engine, which includes contacting the exhaust stream with the zoned catalytic article as defined in claim 1.

* * * * *